(12) United States Patent
Tada

(10) Patent No.: US 12,471,595 B2
(45) Date of Patent: Nov. 18, 2025

(54) LIQUID PESTICIDAL COMPOSITION

(71) Applicant: SUMITOMO CHEMICAL COMPANY, LIMITED, Chuo-ku (JP)

(72) Inventor: Hiroto Tada, Takarazuka (JP)

(73) Assignee: SUMITOMO CHEMICAL COMPANY, LIMITED, Tokyo (JP)

( * ) Notice: Subject to any disclaimer, the term of this patent is extended or adjusted under 35 U.S.C. 154(b) by 747 days.

(21) Appl. No.: 17/782,400

(22) PCT Filed: Nov. 2, 2020

(86) PCT No.: PCT/JP2020/041076
§ 371 (c)(1),
(2) Date: Jun. 3, 2022

(87) PCT Pub. No.: WO2021/111789
PCT Pub. Date: Jun. 10, 2021

(65) Prior Publication Data
US 2023/0011898 A1    Jan. 12, 2023

(30) Foreign Application Priority Data

Dec. 5, 2019 (JP) ................ 2019-220623

(51) Int. Cl.
*A01N 43/22* (2006.01)
*A01N 25/04* (2006.01)
*A01N 25/30* (2006.01)
*A01N 43/40* (2006.01)

(52) U.S. Cl.
CPC ............ *A01N 43/22* (2013.01); *A01N 25/04* (2013.01); *A01N 25/30* (2013.01); *A01N 43/40* (2013.01)

(58) Field of Classification Search
CPC ........ A01N 43/22; A01N 25/04; A01N 25/30; A01N 43/40; A01N 25/02; A01P 3/00
See application file for complete search history.

(56) References Cited

U.S. PATENT DOCUMENTS

2002/0042440 A1    4/2002 Mizutani et al.
2020/0205401 A1*   7/2020 Bell ................... A01N 25/02

FOREIGN PATENT DOCUMENTS

| AU | 2018229453 A1 | 4/2019 |
|---|---|---|
| CN | 104955331 A | 9/2015 |
| JP | 2012-126655 A | 7/2012 |
| JP | 2016-56099 A | 4/2016 |
| JP | 2016-65043 A | 4/2016 |
| WO | WO 2014/119519 A1 | 8/2014 |

OTHER PUBLICATIONS

Fluxametamide: Human Health Risk Assessment to Support the Establishment of a Tolerance without U.S. Registration in/on Tea. 2020, United States Environmental Protection Agency, pp. 1-38. (Year: 2020).*
Combined Office Action and Search Report issued Nov. 16, 2022 in Chinese Patent Application No. 202080084209.4 (with English translation), 12 pages.
Extended European Search Report issued Oct. 31, 2023, in corresponding European Patent Application No. 20895899.1, 8 pages.
Brazilian Search Report and Written Opinion issued Dec. 26, 2023, in corresponding Brazilian Patent Application No. BR112022010973-3 (with English Translation), 8 pages.
International Search Report mailed on Jan. 12, 2021 in PCT/JP2020/041076 filed on Nov. 2, 2020, 2 pages.
Indian Office Action issued Jan. 30, 2024 in Indian Patent Application No. 202247036935 (with English translation), 5 pages.

* cited by examiner

*Primary Examiner* — Ali Soroush
*Assistant Examiner* — Andriae M Holt
(74) *Attorney, Agent, or Firm* — Oblon, McClelland, Maier & Neustadt, L.L.P.

(57) ABSTRACT

Provided herein is a liquid pesticidal composition, comprising: (a) 3 to 10 mass % of a pesticidal active ingredient having a water solubility at 25° C. of 15 mass ppm or less and a melting point of 10° C. or more; (b) 3.6 to 60 mass % of a first solvent that is ε-caprolactone; (c) 19.5 to 85 mass % of a second solvent having a water solubility at 25° C. of 1 mass % or less; and (d) 1 to 30 mass % of a surfactant, wherein a total content of the pesticidal active ingredient, the first solvent, the second solvent, and the surfactant is 60 mass % or more, a content of the first solvent relative to a content of the pesticidal active ingredient is from 1.2 to 15.0 times by mass, and a content of the second solvent relative to the content of the pesticidal active ingredient is from 6.5 to 25.0 times by mass.

11 Claims, No Drawings

LIQUID PESTICIDAL COMPOSITION

CROSS-REFERENCE TO RELATED APPLICATIONS

The present application is a 35 U.S.C. § 371 national stage patent application of International patent application PCT/JP2020/041076, filed on Nov. 2, 2020, which is based on and claims the benefits of priority to Japanese Application No. 2019-220623, filed on Dec. 5, 2019. The entire contents of these applications are incorporated herein by reference.

TECHNICAL FIELD

The present invention relates to a liquid pesticidal composition.

BACKGROUND ART

International Patent Laying-Open No. WO 2014/119519 (PTL 1) discloses a pesticidal emulsifiable composition containing a particular pesticidal active ingredient, a polar solvent, a nonpolar solvent, and a surfactant. U.S. Patent Laying-Open No. US 2002/0042440 (PTL 2) discloses an emulsifiable composition for the control of insects containing a particular pesticidal active ingredient, a weakly polar solvent, an emulsifier, and, optionally, an additional solvent.

CITATION LIST

Patent Literature

PTL 1: International Patent Laying-Open No. WO 2014/119519
PTL 2: U.S. Patent Laying-Open No. US 2002/0042440

SUMMARY OF INVENTION

Technical Problem

An object of the present invention is to provide a liquid pesticidal composition comprising a pesticidal active ingredient having a water solubility at 25° C. of 15 mass ppm or less and a melting point of 10° C. or more, wherein the liquid pesticidal composition has an excellent storage stability at low temperatures as well as an excellent emulsion stability when mixed with water.

Solution to Problem

The present invention provides a liquid pesticidal composition described below.
[1] A liquid pesticidal composition, comprising:
  (a) 3 mass % to 10 mass % of a pesticidal active ingredient having a water solubility at 25° C. of 15 mass ppm or less and a melting point of 10° C. or more;
  (b) 3.6 mass % to 60 mass % of a first solvent that is ε-caprolactone;
  (c) 19.5 mass % to 85 mass % of a second solvent having a water solubility at 25° C. of 1 mass % or less; and
  (d) 1 mass % to 30 mass % of a surfactant,
  a total content of the pesticidal active ingredient, the first solvent, the second solvent, and the surfactant being 60 mass % or more,
  a content of the first solvent relative to a content of the pesticidal active ingredient being from 1.2 times by mass to 15.0 times by mass,
  a content of the second solvent relative to the content of the pesticidal active ingredient being from 6.5 times by mass to 25.0 times by mass.
[2] The liquid pesticidal composition according to [1], wherein the pesticidal active ingredient has a water solubility at 25° C. from 0.1 mass ppm to 10 mass ppm and a melting point from 30° C. to 300° C.
[3] The liquid pesticidal composition according to [1] or [2], wherein the pesticidal active ingredient has a partition coefficient (log P) between 1-octanol and water at 25° C. from 2.5 to 5.0, preferably from 3.0 to 4.5.
[4] The liquid pesticidal composition according to any of [1] to [3], wherein the content of the pesticidal active ingredient is from 4 mass % to 10 mass %.
[5] The liquid pesticidal composition according to any of [1] to [4], wherein the content of the first solvent is from 5 mass % to 40 mass %, preferably from 10 mass % to 30 mass %.
[6] The liquid pesticidal composition according to any of [1] to [5], wherein the content of the second solvent is from 40 mass % to 80 mass %, preferably from 50 mass % to 75 mass %.
[7] The liquid pesticidal composition according to any of [1] to [6], wherein a content of the surfactant is from 5 mass % to 20 mass %.
[8] The liquid pesticidal composition according to any of [1] to [7], wherein the content of the first solvent relative to the content of the pesticidal active ingredient is from 1.3 times by mass to 6.0 times by mass, preferably from 1.3 times by mass to 3.3 times by mass.
[9] The liquid pesticidal composition according to any of [1] to [8], wherein the content of the second solvent relative to the content of the pesticidal active ingredient is from 7.0 times by mass to 13.0 times by mass, preferably from 7.0 times by mass to 9.0 times by mass.
[10] The liquid pesticidal composition according to any of [1] to [9], wherein the second solvent comprises an aromatic hydrocarbon.
[11] The liquid pesticidal composition according to [10], wherein the aromatic hydrocarbon comprises one or more selected from the group consisting of alkyl benzenes and alkyl naphthalenes.
[12] The liquid pesticidal composition according to any of [1] to [11], wherein the pesticidal active ingredient is one or more selected from the group consisting of mefentrifluconazole, pyraclostrobin, pydiflumetofen, pyridachlometyl, and ethyl 2-[(3-{2-chloro-4-fluoro-5-[3-methyl-4-(trifluoromethyl)-2,6-dioxo-1,2,3,6-tetrahydropyrimidin-1(2H)-yl]phenoxy}pyridin-2-yl)oxy]acetate.

Advantageous Effects of Invention

It is made possible to provide a liquid pesticidal composition comprising a pesticidal active ingredient having a water solubility at 25° C. of 15 mass ppm or less and a melting point of 10° C. or more, wherein the liquid pesticidal composition has an excellent storage stability at low temperatures as well as an excellent emulsion stability when mixed with water.

DESCRIPTION OF EMBODIMENTS

A liquid pesticidal composition according to the present invention (hereinafter, also simply called "liquid pesticidal composition") comprises:
  (a) a pesticidal active ingredient having a water solubility at 25° C. of 15 mass ppm or less and a melting point of 10° C. or more (hereinafter, also called "hydrophobic pesticidal active ingredient");
(b) a first solvent that is ε-caprolactone;
(c) a second solvent having a water solubility at 25° C. of 1 mass % or less; and
(d) a surfactant.

The term "liquid" herein refers to being fluid at 25° C. Preferably, the liquid pesticidal composition is a liquid in which at least the pesticidal active ingredient, among its ingredients, is completely or nearly completely dissolved in the solvent. More preferably, the liquid pesticidal composition is a liquid in which at least the pesticidal active ingredient and the surfactant, among its ingredients, are completely or nearly completely dissolved in the solvent. Further preferably, the liquid pesticidal composition is a liquid in which all of its ingredients are completely or nearly completely dissolved in the solvent.

The liquid pesticidal composition can be suitably used as a liquid pesticidal formulation called an emulsifiable concentrate (EC) in the pesticidal field.

In the following, a detailed description will be given of ingredients that the liquid pesticidal composition according to the present invention contains or may contain.

(a) Hydrophobic Pesticidal Active Ingredient

The liquid pesticidal composition contains one, two, or more hydrophobic pesticidal active ingredients.

Examples of the hydrophobic pesticidal active ingredient include an insecticidal active ingredient having a water solubility at 25° C. of 15 mass ppm or less and a melting point of 10° C. or more (hereinafter, also called "hydrophobic insecticidal active ingredient"), a fungicidal active ingredient having a water solubility at 25° C. of 15 mass ppm or less and a melting point of 10° C. or more (hereinafter, also called "hydrophobic fungicidal active ingredient"), and a herbicidal active ingredient having a water solubility at 25° C. of 15 mass ppm or less and a melting point of 10° C. or more (hereinafter, also called "hydrophobic herbicidal active ingredient").

Examples of the hydrophobic insecticidal active ingredient are listed below:
abamectin, acrinathrin, alpha-cypermethrin, bifenthrin, buprofezin, chlorantraniliprole, chlorpyrifos, chlorpyrifos-methyl, chromafenozide, cyantraniliprole, cypermethrin, deltamethrin, diflubenzuron, esfenvalerate, etofenprox, etoxazole, fenoxycarb, flubendiamide, gamma-cyhalothrin, indoxacarb, lambda-cyhalothrin, lufenuron, methoxyfenozide, oxazosulfyl, pirimiphos-methyl, pyridaben, pyriproxyfen, spirodiclofen, spiromesifen, tebufenozide, teflubenzuron, tefluthrin, triflumuron.

Examples of the hydrophobic fungicidal active ingredient are listed below:
ametoctradin, amisulbrom, azoxystrobin, benthivalicarb-isopropyl, benzovindiflupyr, bixafen, Bordeaux mixture, boscalid, bupirimate, captan, chlorothalonil, copper oxychloride, copper(II) sulfate, cyazofamid, cyflufenamid, cyprodinil, difenoconazole, dimoxystrobin, dithianon, epoxiconazole, famoxadone, fenbuconazole, fenpicoxamid, florylpicoxamid, fludioxonil, fluindapyr, fluopicolide, fluoxastrobin, fluquinconazole, flutolanil, fluxapyroxad, folpet, folpel, ipconazole, isofetamid, isoflucypram, kresoxim-methyl, mancozeb, mandipropamid, mefentrifluconazole, mepanipyrim, metiram, metrafenone, metyltetraprole, oxathiapiprolin, pencycuron, penflufen, penthiopyrad, picoxystrobin, proquinazid, pydiflumetofen, pyraclostrobin, pyrapropoyne, pyridachlometyl, pyriofenone, quinoxyfen, sedaxane, sulfur, tolclofos-methyl, trifloxystrobin, triflumizole, triticonazole, ziram, zoxamide.

Examples of the hydrophobic herbicidal active ingredient are listed below:
aclonifen, amidosulfuron, beflubutamid, benfluralin, bifenox, desmedipham, diflufenican, flumioxazin, flurtamone, halosulfuron-methyl, isoxaben, isoxaflutole, lenacil, mesosulfuron-methyl, oryzalin, oxadiazon, oxyfluorfen, pendimethalin, penoxsulam, phenmedipham, picolinafen, propaquizafop, propyzamide, pyraflufen-ethyl, pyridate, terbuthylazine, tralkoxydim, tri-allate, triflusulfuron-methyl, ethyl 2-[(3-{2-chloro-4-fluoro-5-[3-methyl-4-(trifluoromethyl)-2,6-dioxo-1,2,3,6-tetrahydropyrimidin-1(2H)-yl]phenoxy}pyridin-2-yl)oxy]acetate.

The liquid pesticidal composition may contain one or more hydrophobic pesticidal active ingredients selected from the group consisting of the hydrophobic insecticidal active ingredient, the hydrophobic fungicidal active ingredient, and the hydrophobic herbicidal active ingredient. Each of the hydrophobic insecticidal active ingredient, the hydrophobic fungicidal active ingredient, and the hydrophobic herbicidal active ingredient may comprise one, two, or more types of the same ingredient.

Preferably, the liquid pesticidal composition contains one or more hydrophobic pesticidal active ingredients selected from the group consisting of the hydrophobic insecticidal active ingredient, the hydrophobic fungicidal active ingredient, and the hydrophobic herbicidal active ingredient, except metyltetraprole.

More preferably, the liquid pesticidal composition contains one or more hydrophobic pesticidal active ingredients selected from the group consisting of the hydrophobic fungicidal active ingredient and the hydrophobic herbicidal active ingredient. Each of the hydrophobic fungicidal active ingredient and the hydrophobic herbicidal active ingredient may comprise one, two, or more types of the same ingredient.

Further preferably, the liquid pesticidal composition contains one or more hydrophobic pesticidal active ingredients selected from the group consisting of the hydrophobic fungicidal active ingredient and the hydrophobic herbicidal active ingredient, except metyltetraprole.

Yet further preferably, the liquid pesticidal composition contains one or more hydrophobic pesticidal active ingredients selected from the group consisting of DMI fungicides such as mefentrifluconazole, QoI fungicides such as azoxystrobin and pyraclostrobin, SDHI fungicides such as bixafen, benzovindiflupyr, fluxapyroxad, isoflucypram, and pydiflumetofen, β-tubulin-polymerization-inhibiting fungicides such as pyridachlometyl, and protoporphyrinogen oxidase (PPO)-inhibiting herbicides such as ethyl 2-[(3-{2-chloro-4-fluoro-5-[3-methyl-4-(trifluoromethyl)-2,6-dioxo-1,2,3,6-tetrahydropyrimidin-1(2H)-yl]phenoxy}pyridin-2-yl)oxy]acetate. Classification of the above fungicides is found in FRAC classification on mode of action, and classification of the herbicides is found in HRAC classification on mode of action. Each of the hydrophobic fungicidal active ingredient and the hydrophobic herbicidal active ingredient may comprise one, two, or more types of the same ingredient.

Particularly preferably, the liquid pesticidal composition contains one or more hydrophobic pesticidal active ingredients selected from the group consisting of DMI fungicides, QoI fungicides, SDHI fungicides, β-tubulin-polymerization-inhibiting fungicides, and protoporphyrinogen oxidase (PPO)-inhibiting herbicides, except metyltetraprole.

In one embodiment, the liquid pesticidal composition contains one or more hydrophobic pesticidal active ingredients selected from the group consisting of mefentrifluconazole, azoxystrobin, pyraclostrobin, bixafen, benzovindiflupyr, fluxapyroxad, isoflucypram, pydiflumetofen, fenpicoxamid, florylpicoxamid, chlorothalonil, folpel, mancozeb, cyprodinil, pyridachlometyl, ethyl 2-[(3-{2-chloro-4-fluoro-5-[3-methyl-4-(trifluoromethyl)-2,6-dioxo-1,2,3,6-tetrahydropyrimidin-1(2H)-yl]phenoxy}pyridin-2-yl)oxy]acetate, aclonifen, amidosulfuron, beflubutamid, and benfluralin.

In the above embodiment, the liquid pesticidal composition preferably contains one or more hydrophobic pesticidal active ingredients selected from the group consisting of mefentrifluconazole, azoxystrobin, pyraclostrobin, bixafen, benzovindiflupyr, fluxapyroxad, isoflucypram, pydiflumetofen, fenpicoxamid, florylpicoxamid, chlorothalonil, folpel, mancozeb, cyprodinil, pyridachlometyl, and ethyl 2-[(3-{2-chloro-4-fluoro-5-[3-methyl-4-(trifluoromethyl)-2,6-dioxo-1,2,3,6-tetrahydropyrimidin-1(2H)-yl]phenoxy}pyridin-2-yl)oxy]acetate.

In the above embodiment, the liquid pesticidal composition more preferably contains one or more hydrophobic pesticidal active ingredients selected from the group consisting of mefentrifluconazole, pyraclostrobin, benzovindiflupyr, fluxapyroxad, isoflucypram, pydiflumetofen, fenpicoxamid, florylpicoxamid, pyridachlometyl, and ethyl 2-[(3-{2-chloro-4-fluoro-5-[3-methyl-4-(trifluoromethyl)-2,6-dioxo-1,2,3,6-tetrahydropyrimidin-1(2H)-yl]phenoxy}pyridin-2-yl)oxy]acetate.

In the above embodiment, the liquid pesticidal composition further preferably contains one or more hydrophobic pesticidal active ingredients selected from the group consisting of mefentrifluconazole, pyraclostrobin, pydiflumetofen, pyridachlometyl, and ethyl 2-[(3-{2-chloro-4-fluoro-5-[3-methyl-4-(trifluoromethyl)-2,6-dioxo-1,2,3,6-tetrahydropyrimidin-1(2H)-yl]phenoxy}pyridin-2-yl)oxy]acetate.

The water solubility of the hydrophobic pesticidal active ingredient at 25° C. is 15 mass ppm or less, and, for example, it may be 13 mass ppm or less, even 10 mass ppm or less. The water solubility of the hydrophobic pesticidal active ingredient at 25° C. is usually 0.001 mass ppm or more, and it may be 0.01 mass ppm or more.

The water solubility of the hydrophobic pesticidal active ingredient at 25° C. is preferably from 0.01 mass ppm to 13 mass ppm, more preferably from 0.1 mass ppm to 10 mass ppm, further preferably from 0.5 mass ppm to 5 mass ppm.

Herein, the water solubility at 25° C. refers to the solubility in water at a temperature of 25° C. and pH7. For example, a water solubility at 25° C. of 15 mass ppm means that the solubility in 1 g of water at a temperature of 25° C. and pH7 is $15 \times 10^{-6}$ g.

As the water solubility of the hydrophobic pesticidal active ingredient, a value found in references may be used. When a corresponding value is not found in references, the water solubility of the hydrophobic pesticidal active ingredient may be measured by determining the saturation solubility in water at a temperature of 25° C. and pH7 by high-performance liquid chromatography.

The melting point of the hydrophobic pesticidal active ingredient is 10° C. or more, and, for example, it may be 20° C. or more, even 30° C. or more. The melting point of the hydrophobic pesticidal active ingredient is usually 300° C. or less, and it may be 180° C. or less.

The melting point of the hydrophobic pesticidal active ingredient is preferably from 20° C. to 300° C., more preferably from 30° C. to 180° C.

As the melting point of the hydrophobic pesticidal active ingredient, a value found in references may be used. When a corresponding value is not found in references, the melting point of the hydrophobic pesticidal active ingredient may be measured as follows: a sample is filled in a capillary tube and heated, and the temperature at which the sample is melted and no solid is observed inside the capillary tube is used as the melting point.

The hydrophobic pesticidal active ingredient contained in the liquid pesticidal composition has a water solubility at 25° C. of 15 mass ppm or less and a melting point of 10° C. or more, preferably a water solubility at 25° C. from 0.01 mass ppm to 13 mass ppm and a melting point from 20° C. to 300° C., more preferably a water solubility at 25° C. from 0.1 mass ppm to 10 mass ppm and a melting point from 30° C. to 180° C., further preferably a water solubility at 25° C. from 0.5 mass ppm to 5 mass ppm and a melting point from 30° C. to 180° C.

According to the present invention, even when a pesticidal active ingredient like those described above having a poor water solubility and a relatively high melting point is used, it is possible to provide a liquid pesticidal composition having an excellent storage stability at low temperatures as well as an excellent emulsion stability when mixed with water.

The hydrophobic pesticidal active ingredient usually has the partition coefficient (log P) between 1-octanol and water at 25° C. from 2.3 to 5.3, preferably from 2.5 to 5.0, more preferably from 3.0 to 4.5. With the partition coefficient within this range, the hydrophobic pesticidal active ingredient is suitable as a pesticidal active ingredient for formulating in an emulsifiable concentrate.

As log P, a value found in references may be used. When a corresponding value is not found in references, log P may be measured by high-performance liquid chromatography in accordance with OECD Test Guideline 117.

With the total amount of the liquid pesticidal composition being taken as 100 mass %, the content of the hydrophobic pesticidal active ingredient in the liquid pesticidal composition is usually from 3 mass % to 10 mass %, preferably from 4 mass % to 10 mass %, more preferably from 5 mass % to 10 mass %, further preferably from 5 mass % to 8 mass %. Other preferable ranges of this content are, for example, from 3 mass % to 8 mass %, from 4 mass % to 8 mass %, from 3 mass % to 9 mass %, from 4 mass % to 9 mass %, and from 5 mass % to 9 mass %.

Adjusting the content of the hydrophobic pesticidal active ingredient to the above range is preferable for appropriately increasing the content of the hydrophobic pesticidal active ingredient in the liquid pesticidal composition, while ensuring that the liquid pesticidal composition has an excellent storage stability at low temperatures as well as an excellent emulsion stability when mixed with water.

When the liquid pesticidal composition contains two or more hydrophobic pesticidal active ingredients, the above-described content of the hydrophobic pesticidal active ingredient is a total content of these two or more hydrophobic pesticidal active ingredients. The same is true for other ingredients (to be described below) that the liquid pesticidal composition contains or may contain; when a given ingredient comprises two or more types of the same ingredient, the content of that given ingredient is a total content of these two or more types, unless otherwise specified.

(b) First Solvent

The liquid pesticidal composition contains a first solvent that is ε-caprolactone.

With the total amount of the liquid pesticidal composition being taken as 100 mass %, the content of the first solvent in the liquid pesticidal composition is usually from 3.6 mass % to 60 mass %, preferably from 5 mass % to 60 mass %, more preferably from 5 mass % to 40 mass %, further preferably from 10 mass % to 40 mass %, particularly preferably from 10 mass % to 30 mass %. Other preferable ranges of this content are, for example, from 3.6 mass % to 50 mass %, from 3.6 mass % to 40 mass %, from 3.6 mass % to 30 mass %, from 5 mass % to 50 mass %, from 5 mass % to 30 mass %, from 6 mass % to 60 mass %, from 6 mass % to 50 mass %, from 6 mass % to 40 mass %, and from 6 mass % to 30 mass %.

The content of the first solvent relative to the content of the hydrophobic pesticidal active ingredient is usually from 1.2 times by mass to 15.0 times by mass, preferably from 1.2 times by mass to 9.0 times by mass, more preferably from 1.2 times by mass to 8.0 times by mass, further preferably from 1.3 times by mass to 6.0 times by mass, particularly preferably from 1.3 times by mass to 3.3 times by mass. Other preferable ranges of the ratio (mass ratio) of the content of the first solvent to the content of the hydrophobic pesticidal active ingredient are, for example, from 1.2 times by mass to 6.0 times by mass, from 1.2 times by mass to 3.3 times by mass, from 1.3 times by mass to 10.0 times by mass, from 1.3 times by mass to 9.0 times by mass, and from 1.3 times by mass to 8.0 times by mass.

Adjusting the content of the first solvent in the liquid pesticidal composition and the ratio (mass ratio) of the content of the first solvent to the content of the hydrophobic pesticidal active ingredient to the above-described ranges, respectively, is preferable for ensuring that the liquid pesticidal composition has an excellent storage stability at low temperatures as well as an excellent emulsion stability when mixed with water, provided that 1) the contents of the hydrophobic pesticidal active ingredient, the second solvent, and the surfactant in the liquid pesticidal composition, 2) the total content of the hydrophobic pesticidal active ingredient, the first solvent, the second solvent, and the surfactant, and 3) the ratio (mass ratio) of the content of the second solvent to the content of the hydrophobic pesticidal active ingredient are adjusted to specific ranges, respectively.

(c) Second Solvent

The liquid pesticidal composition contains one, two, or more second solvents. The second solvent is a solvent having a water solubility at 25° C. of 1 mass % or less.

Examples of the second solvent include:
alcohols such as octanol and polypropylene glycol;
esters such as methyl caprylate, methyl laurate, methyl myristate, methyl salicylate, methyl palmitate, methyl oleate, ethyl acetate, ethyl palmitate, octyl acetate, benzyl acetate, dimethyl phthalate, diethyl phthalate, methyl benzoate, ethyl benzoate, dimethyl 2-methylglutarate, dimethyl 2-ethylsuccinate, dimethyl adipate, dioctyl succinate, didecyl adipate, tert-butyl acetoacetate, allyl acetoacetate, and 2-ethylhexyl lactate;
ethers such as propylene glycol phenyl ether;
ketones such as acetophenone;
amides such as N,N-dimethyloctanamide, N,N-dimethyldecanamide, N,N-dimethyldodecanamide, N,N-dimethyltetradecanamide, N,N-dimethyloctadecanamide, N,N-dimethyl-9-deceneamide, and fatty acid dimethylamides;
lactams such as N-octyl-caprolactam, N-decyl-caprolactam, N-dodecyl-caprolactam, N-octyl-pyrrolidone, N-decyl-pyrrolidone, N-dodecyl-pyrrolidone, N-octyl-valerolactam, N-decyl-valerolactam, and N-dodecyl-valerolactam;
imidazolidinone;
cyclic urea derivatives;
cyclic carbonic acid esters;
aliphatic hydrocarbons such as decane, tridecane, tetradecane, hexadecane, octadecane, normal paraffin, isoparaffin, cycloparaffin, 1-undecene, and 1-heneicosene;
aromatic hydrocarbons, for example, alkyl benzenes such as toluene, xylene, ethylbenzene, octadecylbenzene, dialkylbenzene, and trialkylbenzene, alkyl naphthalenes such as methylnaphthalene, dimethylnaphthalene, dodecylnaphthalene, and tridecylnaphthalene, and phenylxylylethane and 1-phenyl-1-ethylphenylethane, and a mixture of these;
fatty acids such as oleic acid, capric acid, and enanthic acid;
animal- or vegetable-derived oils such as olive oil, soybean oil, rape oil, castor oil, linseed oil, cottonseed oil, palm oil, avocado oil, and shark liver oil; and
mineral oils such as machine oil.

As the second solvent, a commercially available solvent may be used. Examples of the commercially available product for use as the second solvent include, in trade names, Agnique AMD810 (mixture of N,N-dimethyloctanamide and N,N-dimethyldecanamide, manufactured by BASF), Agnique AMD10 (N,N-dimethyldecanamide, manufactured by BASF), Agnique AMD12 (N,N-dimethyldodecanamide, manufactured by BASF), Rhodiasolv ADMA810 (mixture of N,N-dimethyloctanamide and N,N-dimethyldecanamide, manufactured by Solvay Nicca), Rhodiasolv ADMA-10 (N,N-dimethyldecanamide, manufactured by Solvay Nicca), Hallcomid M-8-10 (mixture of N,N-dimethyloctanamide and N,N-dimethyldecanamide, manufactured by Stepan), Hallcomid M-10 (N,N-dimethyldecanamide, manufactured by Stepan), Hallcomid M-12 (N,N-dimethyldodecanamide, manufactured by Stepan), Hallcomid M-18 (N,N-dimethyloctadecanamide, manufactured by Stepan), Hallcomid 1025 (N,N-dimethyl-9-deceneamide, manufactured by Stepan), Genagen 4166 (fatty acid dimethylamide, manufactured by Clariant), Genagen 4296 (fatty acid dimethylamide, manufactured by Clariant), Rhodiasolv Iris (mixture of dimethyl 2-methylglutarate, dimethyl 2-ethylsuccinate, and dimethyl adipate, manufactured by Solvay), PURASOLV EHL (2-ethylhexyl-L-lactate, manufactured by Corbion purac), AGSOLEX 8 (N-octyl-pyrrolidone, manufactured by Ashland), AGSOLEX 12 (N-dodecyl-pyrrolidone, manufactured by Ashland), Stepan C-25 (methyl caprylate, manufactured by Stepan), Stepan C-42 (mixture of methyl laurate and methyl myristate, manufactured by Stepan), Stepan C-65 (mixture of methyl palmitate and methyl oleate, manufactured by Stepan), Dowanol PPh (propylene glycol phenyl ether, manufactured by Dow Chemical), Nisseki Hisol SAS-296 (mixture of 1-phenyl-1-xylylethane and 1-phenyl-1-ethylphenylethane, manufactured by JX Nippon Oil & Energy), SOLVESSO 100 (containing C9-C10 dialkyl- and trialkylbenzene as its main aromatic hydrocarbon, manufactured by ExxonMobil Chemical), SOLVESSO 150 (containing C10-C11 alkyl benzene as its main aromatic hydrocarbon, manufactured by ExxonMobil Chemical), SOLVESSO 150ND (containing C10-C11 alkyl benzene as its main aromatic hydrocarbon, manufactured by ExxonMobil Chemical), SOLVESSO 200 (containing C10-C13 alkyl naphthalene as its main aromatic hydrocarbon, manufactured by ExxonMobil Chemical), and SOLVESSO 200ND (containing C10-C13 alkyl naphthalene as its main aromatic hydrocarbon, manufactured by ExxonMobil Chemical).

For ensuring that the liquid pesticidal composition has a favorable storage stability at low temperatures as well as a favorable emulsion stability when mixed with water, it is preferable that the second solvent comprise an aromatic hydrocarbon. Preferably, the aromatic hydrocarbon comprises one or more selected from the group consisting of alkyl benzenes and alkyl naphthalenes, more preferably one or more selected from the group consisting of C9-C12 alkyl benzenes and C10-C15 alkyl naphthalenes. The second solvent may consist of an aromatic hydrocarbon.

For ensuring that the liquid pesticidal composition has a favorable storage stability at low temperatures as well as a favorable emulsion stability when mixed with water, it is also preferable that the second solvent comprise the above-described aromatic hydrocarbon and an amide. Preferably, the amide is N,N-dimethylalkanamide with a C6-C18 alkyl chain. The N,N-dimethylalkanamide with a C6-C18 alkyl chain may be, for example, one or more selected from the group consisting of N,N-dimethyloctanamide and N,N-dimethyldecanamide. The second solvent may consist of the aromatic hydrocarbon and the amide.

The water solubility of the second solvent at 25° C. is 1 mass % or less, and, for example, it may be 0.9 mass % or less, even 0.8 mass % or less. It is preferable for the liquid pesticidal composition to contain a second solvent having a water solubility within this range, because such a liquid pesticidal composition when used as an emulsifiable concentrate can readily form an emulsion when mixed with water. The water solubility of the second solvent at 25° C. is usually 0 mass % or more, and it may be $10^{-5}$ mass % or more.

As the water solubility of the second solvent, a value found in the database (Solubility Database) of International Union of Pure and Applied Chemistry (IUPAC) or National Institute of Standards and Technology (NIST) may be used. When a corresponding value is not found in the database, the water solubility of the second solvent may be measured by determining the saturation solubility in water at a temperature of 25° C. and pH7 by high-performance liquid chromatography.

With the total amount of the liquid pesticidal composition being taken as 100 mass %, the content of the second solvent in the liquid pesticidal composition is usually from 19.5 mass % to 85 mass %, preferably from 25 mass % to 85 mass %, more preferably from 25 mass % to 80 mass %, further preferably from 30 mass % to 80 mass %, yet further preferably from 40 mass % to 80 mass %, particularly preferably from 50 mass % to 75 mass %. Other preferable ranges of this content are, for example, from 19.5 mass % to 80 mass %, from 19.5 mass % to 75 mass %, from 25 mass % to 75 mass %, from 30 mass % to 85 mass %, from 30 mass % to 75 mass %, from 40 mass % to 85 mass %, from 40 mass % to 75 mass %, from 50 mass % to 85 mass %, and from 50 mass % to 80 mass %.

The content of the second solvent relative to the content of the hydrophobic pesticidal active ingredient is usually from 6.5 times by mass to 25.0 times by mass, preferably from 6.5 times by mass to 13.0 times by mass, more preferably from 6.6 times by mass to 13.0 times by mass, further preferably from 6.8 times by mass to 13.0 times by mass, yet further preferably from 7.0 times by mass to 13.0 times by mass, particularly preferably from 7.0 times by mass to 9.0 times by mass. Other preferable ranges of the ratio (mass ratio) of the content of the second solvent to the content of the hydrophobic pesticidal active ingredient are, for example, from 6.5 times by mass to 20.2 times by mass, from 6.5 times by mass to 18.2 times by mass, from 6.5 times by mass to 11.0 times by mass, from 6.5 times by mass to 9.0 times by mass, from 6.6 times by mass to 11.0 times by mass, from 6.6 times by mass to 9.0 times by mass, and from 6.8 times by mass to 9.0 times by mass.

Adjusting the content of the second solvent in the liquid pesticidal composition and the ratio of the content of the second solvent to the content of the hydrophobic pesticidal active ingredient to the above-described ranges, respectively, is preferable for ensuring that the liquid pesticidal composition has an excellent storage stability at low temperatures as well as an excellent emulsion stability when mixed with water, provided that 1) the contents of the hydrophobic pesticidal active ingredient, the first solvent, and the surfactant in the liquid pesticidal composition, 2) the total content of the hydrophobic pesticidal active ingredient, the first solvent, the second solvent, and the surfactant, and 3) the ratio of the content of the first solvent to the content of the hydrophobic pesticidal active ingredient are adjusted to specific ranges, respectively.

For ensuring that the liquid pesticidal composition has a favorable storage stability at low temperatures as well as a favorable emulsion stability when mixed with water, the liquid pesticidal composition preferably has the below-described mass ratio of the content of the first solvent to the content of the hydrophobic pesticidal active ingredient (hereinafter, also called "(First solvent)/(Hydrophobic pesticidal active ingredient)") and the below-described mass ratio of the content of the second solvent to the content of the hydrophobic pesticidal active ingredient (hereinafter, also called "(Second solvent)/(Hydrophobic pesticidal active ingredient)"):

(1) (First solvent)/(Hydrophobic pesticidal active ingredient): from 1.2 to 15.0

(Second solvent)/(Hydrophobic pesticidal active ingredient): from 6.5 to 20.2, from 6.6 to 20.2, from 6.6 to 18.2, from 6.6 to 13.0, from 6.8 to 13.0, from 7.0 to 13.0, from 9.0 to 13.0, or from 7.0 to 9.0, or (2) (First solvent)/(Hydrophobic pesticidal active ingredient): from 1.2 to 10.0

(Second solvent)/(Hydrophobic pesticidal active ingredient): from 6.5 to 13.0, from 6.6 to 13.0, from 6.8 to 13.0, from 7.0 to 13.0, from 9.0 to 13.0, or from 7.0 to 9.0, or (3) (First solvent)/(Hydrophobic pesticidal active ingredient): from 1.2 to 9.0

(Second solvent)/(Hydrophobic pesticidal active ingredient): from 6.5 to 13.0, from 6.6 to 13.0, from 6.8 to 13.0, from 7.0 to 13.0, from 9.0 to 13.0, or from 7.0 to 9.0, or (4) (First solvent)/(Hydrophobic pesticidal active ingredient): from 1.2 to 8.0

(Second solvent)/(Hydrophobic pesticidal active ingredient): from 6.5 to 13.0, from 6.6 to 13.0, from 6.8 to 13.0, from 7.0 to 13.0, from 9.0 to 13.0, or from 7.0 to 9.0, or (5) (First solvent)/(Hydrophobic pesticidal active ingredient): from 1.3 to 6.0

(Second solvent)/(Hydrophobic pesticidal active ingredient): from 6.5 to 13.0, from 6.6 to 13.0, from 6.8 to 13.0, from 7.0 to 13.0, from 9.0 to 13.0, or from 7.0 to 9.0, or (6) (First solvent)/(Hydrophobic pesticidal active ingredient): from 1.3 to 3.3
(Second solvent)/(Hydrophobic pesticidal active ingredient): from 6.5 to 13.0, from 6.6 to 13.0, from 6.8 to 13.0, from 7.0 to 13.0, from 9.0 to 13.0, or from 7.0 to 9.0.

(d) Surfactant

The liquid pesticidal composition contains one, two, or more surfactants. Examples of the surfactant include a nonionic surfactant, an anionic surfactant, a cationic surfactant, and an amphoteric surfactant. The liquid pesticidal composition may contain one, two, or more surfactants selected from the group consisting of a nonionic surfactant, an anionic surfactant, a cationic surfactant, and an amphoteric surfactant.

Examples of the nonionic surfactant include:
polyoxyethylene polyoxypropylene block copolymers;
polyoxyalkylene fatty acid esters such as polyoxyethylene fatty acid esters and polyoxyethylene polyoxypropylene fatty acid esters;
polyoxyalkylene alkyl ethers such as polyoxyethylene alkyl ethers and polyoxyethylene polyoxypropylene alkyl ethers;
polyoxyalkylene polyaryl ethers such as polyoxyethylene tristyryl phenyl ether, polyoxyethylene polyaryl ether, and polyoxyethylene polyoxypropylene polyaryl ether;
polyoxyalkylene alkyl aryl ethers such as polyoxyethylene alkyl aryl ethers and polyoxyethylene polyoxypropylene alkyl aryl ethers;
polyoxyalkylene vegetable oils such as polyoxyethylene castor oil and polyoxyethylene polyoxypropylene castor oil;
polyoxyalkylene hydrogenated vegetable oils such as polyoxyethylene hydrogenated castor oil;
glycerol fatty acid esters;
sorbitan fatty acid esters such as sorbitan laurate, sorbitan stearate, sorbitan oleate, and sorbitan trioleate; and
polyoxyalkylene sorbitan fatty acid esters such as polyoxyethylene sorbitan laurate, polyoxyethylene sorbitan stearate, polyoxyethylene sorbitan oleate, and polyoxyethylene sorbitan trioleate.

Examples of the anionic surfactant include:
alkyl aryl sulfonic acid salts such as dodecylbenzenesulfonic acid salts and alkyl naphthalene sulfonic acid salts;
dialkyl sulfosuccinic acid salts such as di(2-ethylhexyl) sulfosuccinic acid salts; and
polyoxyalkylene polyaryl ether sulfuric acid ester salts such as polyoxyethylene distyryl phenyl ether sulfuric acid ester salts.

Each of the above sulfonic acid salts and the above sulfuric acid ester salts may be a sodium salt, a potassium salt, a calcium salt, an ammonium salt, and the like.

Examples of the cationic surfactant include:
alkylamine hydrochloric acid salts such as dodecylamine hydrochloric acid salts;
alkyl quaternary ammonium salts such as dodecyltrimethylammonium salts, alkyl dimethylbenzylammonium salts, alkyl pyridinium salts, alkyl isoquinolinium salts, and dialkyl morpholinium salts;
benzethonium chloride; and
polyalkylvinyl pyridinium salts.

Examples of the amphoteric surfactant include N-laurylalanine, N,N,N-trimethylaminopropionic acid, N,N,N-trihydroxyethylaminopropionic acid, N-hexyl-N,N-dimethylaminoacetic acid, 1-(2-carboxyethyl) pyrimidinium betaine, and lecithin.

As the surfactant, a commercially available surfactant may be used.

Examples of a commercially available nonionic surfactant include, in trade names, Toximul 8323 (polyoxyethylene polyoxypropylene block copolymer, manufactured by Stepan), Atlas G5000 (butyl block copolymer, manufactured by Croda), Atlas G5002L (butyl block copolymer, manufactured by Croda), Antarox B/848 (polyoxyethylene polyoxypropylene block copolymer, manufactured by Solvay), Pegnol 24-O (polyoxyethylene fatty acid ester, manufactured by TOHO Chemical Industry), Pegnol 14-S(polyoxyethylene fatty acid ester, manufactured by TOHO Chemical Industry), Pegnol ST-7 (polyoxyethylene alkyl ether, manufactured by TOHO Chemical Industry), ATPLUS245 (polyoxyethylene polyoxypropylene alkyl ether, manufactured by Croda), Synperonic AB6 (polyoxyalkylene alkyl ether, HLB:12, manufactured by Croda), Brij O3 (polyoxyethylene oleyl ether, HLB:7, manufactured by Croda), Genapol X060 (polyoxyethylene alkyl ether, manufactured by Clariant), Genapol X150 (polyoxyethylene alkyl ether, manufactured by Clariant), Emulsogen TS200 (polyoxyethylene tristyryl phenyl ether, manufactured by Clariant), Emulsogen TS290 (polyoxyethylene tristyryl phenyl ether, manufactured by Clariant), Emulsogen TS540 (polyoxyethylene tristyryl phenyl ether, manufactured by Clariant), Emulsogen TS600 (polyoxyethylene tristyryl phenyl ether, manufactured by Clariant), Emulsogen EL360 (polyoxyethylene castor oil, manufactured by Clariant), Emulsogen EL400 (polyoxyethylene castor oil, manufactured by Clariant), Emulsogen EL540 (polyoxyethylene castor oil, manufactured by Clariant), Solpol T26 (polyoxyethylene alkyl aryl ether, manufactured by TOHO Chemical Industry), Alkamuls OR/40 (polyoxyethylene castor oil, manufactured by Solvay), NIKKOL HCO-20 (polyoxyethylene hydrogenated castor oil, manufactured by Nikko Chemicals), Geronol TE/250 (mixture of polyoxyethylene castor oil and polyoxyethylene polyoxypropylene monobutyl ether, manufactured by Solvay), NIKKOL MGU (glycerol fatty acid ester, manufactured by Nikko Chemicals), NIKKOL DGS-80 (glycerol fatty acid ester, manufactured by Nikko Chemicals), Newcol 20 (sorbitan laurate, manufactured by Nippon Nyukazai), and Newcol 25 (polyoxyethylene sorbitan laurate, manufactured by Nippon Nyukazai).

Examples of a commercially available anionic surfactant include, in trade names, Rhodacal 70 (calcium dodecylbenzenesulfonate, branched, manufactured by Solvay), Rhodacal 70/B (calcium dodecylbenzenesulfonate, linear, manufactured by Solvay), Rhodacal LDS-25/AP (sodium dodecylbenzenesulfonate, linear, manufactured by Solvay), Calsogen 4814 (calcium dodecylbenzenesulfonate, manufactured by Clariant), Phenylsulfonat cal (calcium dodecylbenzenesulfonate, manufactured by Clariant), Geropon CYA/75 (sodium di(2-ethylhexyl) sulfosuccinate, manufactured by Solvay), and Soprophor DSS/7 (polyoxyethylene distyryl phenyl ether sulfuric acid ester ammonium salt, manufactured by Solvay).

Preferably, the liquid pesticidal composition contains a nonionic surfactant. For example, it is preferable that the liquid pesticidal composition contain one, two, or more nonionic surfactants, or it contain one or more nonionic surfactants and one or more anionic surfactants.

When one or more nonionic surfactants and one or more anionic surfactants are used in combination, the content ratio (mass ratio) is from 1:0.1 to 1:40, for example.

Preferably, the nonionic surfactant is one or more selected from the group consisting of polyoxyethylene polyoxypropylene block copolymers, polyoxyalkylene alkyl ethers, and polyoxyalkylene vegetable oils.

Preferably, the anionic surfactant is an alkyl aryl sulfonic acid salt.

With the total amount of the liquid pesticidal composition being taken as 100 mass %, the content of the surfactant in the liquid pesticidal composition is usually from 1 mass % to 30 mass %, preferably from 4 mass % to 28 mass %, more preferably from 5 mass % to 25 mass %, further preferably from 5 mass % to 20 mass %, particularly preferably from 7 mass % to 20 mass %.

The content of the surfactant relative to the content of the hydrophobic pesticidal active ingredient is usually from 0.3 times by mass to 10 times by mass, preferably from 1 times by mass to 10 times by mass, more preferably from 1 times by mass to 7 times by mass.

With the total amount of the liquid pesticidal composition being taken as 100 mass %, the total content of the hydrophobic pesticidal active ingredient, the first solvent, the second solvent, and the surfactant in the liquid pesticidal composition is usually 60 mass % or more, preferably 70 mass % or more, more preferably 75 mass % or more. That total content may be 100 mass %, may be 95 mass % or less, may be 90 mass % or less, or may be 85 mass % or less.

(e) Other Ingredients

The liquid pesticidal composition may contain ingredients other than those described above, as needed.

Examples of such other ingredients include an pesticidal active ingredient other than the hydrophobic pesticidal active ingredient, a solvent other than the first solvent and the second solvent, and a formulation aid.

With the total amount of the pesticidal active ingredient contained in the liquid pesticidal composition being taken as 100 mass %, the content of the hydrophobic pesticidal active ingredient relative to the total content of all the pesticidal active ingredients contained in the liquid pesticidal composition may be, for example, from 20 mass % to 100 mass % or from 30 mass % to 100 mass %. For example, this content is from 50 mass % to 100 mass %, from 60 mass % to 100 mass %, from 80 mass % to 100 mass %, from 90 mass % to 100 mass %, or from 95 mass % to 100 mass %.

For ensuring that the liquid pesticidal composition has a favorable storage stability at low temperatures as well as a favorable emulsion stability when mixed with water, with the total content of solvents contained in the liquid pesticidal composition being taken as 100 mass %, the total content of the first solvent and the second solvent relative to the total content of all the solvents contained in the liquid pesticidal composition is preferably 70 mass % or more, more preferably 80 mass % or more, further preferably 90 mass % or more, yet further preferably 95 mass % or more, especially preferably 98 mass % or more, particularly preferably 100 mass %.

Examples of the formulation aid include an antifoaming agent and a thickener. Examples of the antifoaming agent include a silicone-based antifoaming agent.

As the antifoaming agent, a commercially available antifoaming agent may be used. Examples of a commercially available antifoaming agent include, in trade names, Antifoam C emulsion (silicone-based antifoaming agent, manufactured by Dow Corning Toray), Antifoam A compound (silicone-based antifoaming agent, manufactured by Dow Corning Toray), TSA730 (silicone-based antifoaming agent, manufactured by Momentive Performance Materials Japan), TSA720 (silicone-based antifoaming agent, manufactured by Momentive Performance Materials Japan), SAG1572 (silicone-based antifoaming agent, manufactured by Momentive Performance Materials Japan), SAG1538 (silicone-based antifoaming agent, manufactured by Momentive Performance Materials Japan), KS-538 (silicone-based antifoaming agent, manufactured by Shin-Etsu Chemical), and BYK-019 (silicone-based antifoaming agent, manufactured by BYK Japan).

When the liquid pesticidal composition contains an antifoaming agent, the content is usually from 0.001 mass % to 1 mass %, preferably from 0.002 mass % to 0.8 mass %, with the total amount of the liquid pesticidal composition being taken as 100 mass %.

The thickener may be a thickener soluble in an organic solvent or dispersible in an organic solvent. Examples of the thickener soluble in an organic solvent or dispersible in an organic solvent include organic clay, organic bentonite, organic montmorillonite, and organically-modified castor oil derivatives.

As the thickener, a commercially available thickener soluble in an organic solvent or dispersible in an organic solvent may be used. Examples of a commercially available thickener soluble in an organic solvent or dispersible in an organic solvent include, in trade names, BENTONE SD-1 (organic bentonite, manufactured by ELEMENTIS SPECIALTIES), BENTONE SD-2 (organic bentonite, manufactured by ELEMENTIS SPECIALTIES), BENTONE 34 (organic bentonite, manufactured by ELEMENTIS SPECIALTIES), BENTONE 38 (organic bentonite, manufactured by ELEMENTIS SPECIALTIES), THIXATROL ST (organically-modified castor oil derivative, manufactured by ELEMENTIS SPECIALTIES), THIXCIN R (castor oil derivative, manufactured by ELEMENTIS SPECIALTIES), and THIXATROL 53X (organically-modified castor oil derivative, manufactured by ELEMENTIS SPECIALTIES).

When the liquid pesticidal composition contains a thickener, the content is usually from 0.01 mass % to 5 mass %, with the total amount of the liquid pesticidal composition being taken as 100 mass %.

(f) Production and Use of Liquid Pesticidal Composition

The liquid pesticidal composition may be suitably used as a liquid pesticidal formulation called an emulsifiable concentrate in the pesticidal field.

The liquid pesticidal composition may be produced by a typical method of producing an emulsifiable concentrate, and, for example, it may be produced by mixing the hydrophobic pesticidal active ingredient, the first solvent, the second solvent, and the surfactant, and an optional ingredient.

The liquid pesticidal composition is applied according to a method that is usually employed for an emulsifiable concentrate, to control pests and/or weeds. More specifically, the liquid pesticidal composition is mixed with water to prepare an emulsion, and the resulting emulsion is applied to a plant or a soil in which a plant is grown.

The emulsion is prepared by mixing with water in a volume usually 2 to 10000 times, preferably 10 to 8000 times, more preferably 15 to 6000 times the volume of the emulsifiable concentrate.

EXAMPLES

Next, the present invention will be described in further detail with reference to Examples. The scope of the present invention is not limited to these Examples.

Production Examples 1 to 37: Preparation and Evaluation of Liquid Pesticidal Composition (1) Preparation of Liquid Pesticidal Composition The ingredients specified in Tables 1 to 8 were mixed in the mass ratio (%) specified in Tables 1 to 8 and stirred to uniform dissolution, and thus liquid pesticidal compositions were obtained.

In Tables 1 to 8, "(First solvent)/(Hydrophobic pesticidal active ingredient)" refers to the mass ratio of the content of the first solvent to the content of the hydrophobic pesticidal active ingredient, and "(Second solvent)/(Hydrophobic pesticidal active ingredient)" refers to the mass ratio of the content of the second solvent to the content of the hydrophobic pesticidal active ingredient.

(2) Evaluation of Liquid Pesticidal Composition (2-1) Storage Stability at Low Temperatures In an environment at room temperature, 20 mL of the liquid pesticidal composition and three crystals (crystal size, about 1 mm) of the same type of hydrophobic pesticidal active ingredient as the one contained in the liquid pesticidal composition were placed in a glass vessel, immediately followed by storage at 0° C. Five days after the storage started, changes in the size and the number of crystals were visually examined, and storage stability of the liquid pesticidal composition at low temperatures was evaluated according to the below evaluation criteria. Results are shown in Tables 1 to 8. When rated as A or B, it is considered that crystal deposition or growth tends not to occur at low temperatures, leading to an evaluation that the storage stability at low temperatures is excellent.

A: The crystal size was smaller than the initial size, or the crystals were dissolved and disappeared.

B: No change was observed in the size and the number of crystals.

C: Although no change was observed in the number of crystals, the crystal size was larger than the initial size.

D: The number of crystals increased, and the crystal size was larger than the initial size.

(2-2) Emulsion Stability When Mixed with Water

In an environment at room temperature, 99 mL of CIPAC Standard Water D (hardness, 342 ppm) at 30° C. was added to a 100-mL measuring cylinder with a cap, and, from a height of about 8 cm from the water surface, 1 mL of the liquid pesticidal composition was slowly added dropwise. With the cap on, the measuring cylinder was inverted by 180° over 1 second and then inverted back to the original position over 1 second, and this operation was repeated 10 times in total. Then, the measuring cylinder was left to stand in a thermostatic water bath at 30° C. for 24 hours. After this, the state inside the measuring cylinder was visually examined, and emulsion stability when mixed with water was evaluated according to the below evaluation criteria. Results are shown in Tables 1 to 8. When rated as A, B, or C, it is considered that crystal deposition or growth tends not to occur, leading to an evaluation that the emulsion stability when mixed with water is excellent.

A: No crystal deposition was observed.

B: Deposition of very small crystals was observed, in a number smaller than 10.

C: Deposition of very small crystals was observed, in a number not smaller than 10 and smaller than 100.

D: Deposition of very small crystals was observed, in a number of 100 or more.

E: Deposition of crystals larger than B to D was observed.

|  |  | Production Example | | |
|---|---|---|---|---|
|  |  | 1 | 2 | 3 |
| Hydrophobic pesticidal active ingredient | Mefentrifluconazole | 8.0 | 8.0 | 8.0 |
| First solvent | ε-Caprolactone | 8.0 | 26.4 | 34.0 |
| Second solvent | SOLVESSO 200ND | 74.0 | 55.6 | 48.0 |
| Surfactant | Phenylsulfonat cal | 2.0 | 2.0 | 2.0 |
|  | Emulsogen EL360 | 8.0 | 8.0 | 8.0 |
| Total |  | 100.0 | 100.0 | 100.0 |
| (First solvent)/ (Hydrophobic pesticidal active ingredient) |  | 1.0 | 3.3 | 4.3 |
| (Second solvent)/ (Hydrophobic pesticidal active ingredient) |  | 9.3 | 7.0 | 6.0 |
| Evaluation | Storage stability at low temperatures | C | A | A |
|  | Emulsion stability when mixed with water | B | C | D |

|  |  | Production Example | |
|---|---|---|---|
|  |  | 4 | 5 |
| Hydrophobic pesticidal active ingredient | Pyraclostrobin | 8.0 | 8.0 |
| First solvent | ε-Caprolactone | 10.4 | 26.4 |
| Second solvent | SOLVESSO 200ND | 71.6 | 55.6 |
| Surfactant | Phenylsulfonat cal | 2.0 | 2.0 |
|  | Emulsogen EL360 | 8.0 | 8.0 |
| Total |  | 100.0 | 100.0 |
| (First solvent)/ (Hydrophobic pesticidal active ingredient) |  | 1.3 | 3.3 |
| (Second solvent)/ (Hydrophobic pesticidal active ingredient) |  | 9.0 | 7.0 |
| Evaluation | Storage stability at low temperatures | A | A |
|  | Emulsion stability when mixed with water | A | C |

|  |  | Production Example | | | | | |
|---|---|---|---|---|---|---|---|
|  |  | 6 | 7 | 8 | 9 | 10 | 11 |
| Hydrophobic pesticidal active ingredient | Pydiflumetofen | 4.0 | 4.0 | 4.0 | 4.0 | 4.0 | 4.0 |
| First solvent | ε-Caprolactone | 4.0 | 5.2 | 13.2 | 40.0 | 60.0 | 62.0 |
| Second solvent | SOLVESSO 200ND | 82.0 | 80.8 | 72.8 | 46.0 | 26.0 | 24.0 |
| Surfactant | Phenylsulfonat cal | 2.0 | 2.0 | 2.0 | 2.0 | 2.0 | 2.0 |
|  | Emulsogen EL360 | 8.0 | 8.0 | 8.0 | 8.0 | 8.0 | 8.0 |
|  | Total | 100.0 | 100.0 | 100.0 | 100.0 | 100.0 | 100.0 |
|  | (First solvent)/ (Hydrophobic pesticidal active ingredient) | 1.0 | 1.3 | 3.3 | 10.0 | 15.0 | 15.5 |
|  | (Second solvent)/ (Hydrophobic pesticidal active ingredient) | 20.5 | 20.2 | 18.2 | 11.5 | 6.5 | 6.0 |
| Evaluation | Storage stability at low temperatures | C | B | A | A | A | A |
|  | Emulsion stability when mixed with water | A | A | A | C | C | D |

|  |  | Production Example | | | | | |
|---|---|---|---|---|---|---|---|
|  |  | 12 | 13 | 14 | 15 | 16 | 17 |
| Hydrophobic pesticidal active ingredient | Pydiflumetofen | 6.0 | 6.0 | 6.0 | 5.0 | 6.0 | 6.0 |
| First solvent | ε-Caprolactone | 6.0 | 7.8 | 19.8 | 36.0 | 45.0 | 48.0 |
| Second solvent | SOLVESSO 200ND | 78.0 | 76.2 | 64.2 | 48.0 | 39.0 | 36.0 |
| Surfactant | Phenylsulfonat cal | 2.0 | 2.0 | 2.0 | 2.0 | 2.0 | 2.0 |
|  | Emulsogen EL360 | 8.0 | 8.0 | 8.0 | 8.0 | 8.0 | 8.0 |
|  | Total | 100.0 | 100.0 | 100.0 | 100.0 | 100.0 | 100.0 |
|  | (First solvent)/ (Hydrophobic pesticidal active ingredient) | 1.0 | 1.3 | 3.3 | 5.0 | 7.5 | 8.0 |
|  | (Second solvent)/ (Hydrophobic pesticidal active ingredient) | 13.0 | 12.7 | 10.7 | 8.0 | 6.5 | 6.0 |
| Evaluation | Storage stability at low temperatures | C | B | B | A | A | A |
|  | Emulsion stability when mixed with water | A | A | A | C | C | D |

|  |  | Production Example | | | | | | |
|---|---|---|---|---|---|---|---|---|
|  |  | 18 | 19 | 20 | 21 | 22 | 23 | 24 |
| Hydrophobic pesticidal active ingredient | Pydiflumetofen | 8.0 | 8.0 | 8.0 | 8.0 | 10.0 | 10.0 | 10.0 |
| First solvent | ε-Caprolactone | 8.0 | 10.4 | 26.4 | 34.0 | 10.0 | 13.C | 20.0 |
| Second solvent | SOLVESSO 200ND | 74.0 | 71.6 | 55.6 | 48.0 | 70.0 | 67.0 | 60.0 |
| Surfactant | Phenylsulfonat cal | 2.0 | 2.0 | 2.0 | 2.0 | 2.0 | 2.0 | 2.0 |
|  | Emulsogen EL360 | 8.0 | 8.0 | 8.0 | 8.0 | 8.0 | 8.0 | 8.0 |
|  | Total | 100.0 | 100.0 | 100.0 | 100.0 | 100.0 | 100.0 | 100.0 |
|  | (First solvent)/ (Hydrophobic pesticidal active ingredient) | 1.0 | 1.3 | 3.3 | 4.3 | 1.0 | 1.3 | 2.0 |
|  | (Second solvent)/ (Hydrophobic pesticidal active ingredient) | 9.3 | 9.0 | 7.0 | 6.0 | 7.0 | 6.7 | 6.0 |
| Evaluation | Storage stability at low temperatures | C | B | B | B | C | B | B |
|  | Emulsion stability when mixed with water | B | C | C | D | C | C | D |

|  |  | Production Example | | | |
|---|---|---|---|---|---|
|  |  | 25 | 26 | 27 | 28 |
| Hydrophobic pesticidal active ingredient | Compound A | 5.0 | 6.0 | 6.0 | 6.0 |
| First solvent | ε-Caprolactone | 7.8 | 19.8 | 36.0 | 48.0 |
| Second solvent | SOLVESSO 200ND | 76.2 | 64.2 | 48.0 | 36.0 |
| Surfactant | Phenylsulfonat cal | 2.0 | 2.0 | 2.0 | 2.0 |
|  | Emulsogen EL360 | 8.0 | 8.0 | 8.0 | 8.0 |
| Total |  | 100.0 | 100.0 | 100.0 | 100.0 |
| (First solvent)/(Hydrophobic pesticidal active ingredient) |  | 1.3 | 3.3 | 6.0 | 8.0 |
| (Second solvent)/(Hydrophobic pesticidal active ingredient) |  | 12.7 | 10.7 | 8.0 | 6.0 |
| Evaluation | Storage stability at low temperatures | A | A | A | A |
|  | Emulsion stability when mixed with water | C | C | C | D |

|  |  | Production Example | | | |
|---|---|---|---|---|---|
|  |  | 29 | 30 | 31 | 32 |
| Hydrophobic pesticidal active ingredient | Compound A | 8.0 | 8.0 | 8.0 | 10.0 |
| First solvent | ε-Caprolactone | 10.4 | 26.4 | 34.0 | 13.0 |
| Second solvent | SOLVESSO 200ND | 71.6 | 55.6 | 48.0 | 67.0 |
| Surfactant | Phenylsulfonat cal | 2.0 | 2.0 | 2.0 | 2.0 |
|  | Emulsogen EL360 | 8.0 | 8.0 | 8.0 | 8.0 |
| Total |  | 100.0 | 100.0 | 100.0 | 100.0 |
| (First solvent)/(Hydrophobic pesticidal active ingredient) |  | 1.3 | 3.3 | 4.3 | 1.3 |
| (Second solvent)/(Hydrophobic pesticidal active ingredient) |  | 9.0 | 7.0 | 6.0 | 6.7 |
| Evaluation | Storage stability at low temperatures | B | A | A | A |
|  | Emulsion stability when mixed with water | A | C | E | C |

|  |  | Production Example | | | | |
|---|---|---|---|---|---|---|
|  |  | 33 | 34 | 35 | 36 | 37 |
| Hydrophobic pesticidal active ingredient | Pyridachlometyl | 6.0 | 6.0 | 6.0 | 6.0 | 6.0 |
| First solvent | ε-Caprolactone | 5.4 | 7.8 | 19.8 | 36.0 | 48.0 |
| Second solvent | SOLVESSO 200ND | 78.6 | 76.2 | 64.2 | 48.0 | 36.0 |
| Surfactant | Phenylsulfonat cal | 2.0 | 2.0 | 2.0 | 2.0 | 2.0 |
|  | Emulsogen EL360 | 8.0 | 8.0 | 8.0 | 8.0 | 8.0 |
| Total |  | 100.0 | 100.0 | 100.0 | 100.0 | 100.0 |
| (First solvent)/(Hydrophobic pesticidal active ingredient) |  | 0.9 | 1.3 | 3.3 | 6.0 | 8.0 |
| (Second solvent)/(Hydrophobic pesticidal active ingredient) |  | 13.1 | 12.7 | 10.7 | 8.0 | 6.0 |
| Evaluation | Storage stability at low temperatures | C | B | B | A | A |
|  | Emulsion stability when mixed with water | A | A | A | B | E |

Below is the details of the ingredients specified in Tables 1 to 8.

[1] Mefentrifluconazole: Water solubility at 25° C.=0.81 mass ppm, Melting point=126° C., log P at 25° C.=3.4

[2] Pyraclostrobin: Water solubility at 25° C.=1.9 mass ppm, Melting point=63.7 to 65.2° C., log P at 25° C.=4.0

[3] Pydiflumetofen: Water solubility at 25° C.=1.5 mass ppm, Melting point=112.7° C., log P at 25° C.=3.8

[4] Compound A (Ethyl 2-[(3-{2-chloro-4-fluoro-5-[3-methyl-4-(trifluoromethyl)-2,6-dioxo-1,2,3,6-tetrahydropyrimidin-1(2H)-yl]phenoxy}pyridin-2-yl)oxy]acetate): Water solubility at 25° C.=2.0 mass ppm, Melting point=103.7° C., log P at 25° C.=3.5

[5] Pyridachlometyl: Water solubility at 25° C.=0.6 mass ppm, Melting point=173.9° C., log P at 25° C.=4.1

[6] SOLVESSO 200ND: Containing C10-C13 alkyl naphthalene as its main aromatic hydrocarbon, manufactured by ExxonMobil Chemical

[7] Phenylsulfonat cal: Calcium dodecylbenzenesulfonate, manufactured by Clariant

[8] Emulsogen EL360: Polyoxyethylene castor oil, manufactured by Clariant

The invention claimed is:

1. A liquid pesticidal composition, comprising:
(a) 3 mass % to 10 mass % of a pesticidal active ingredient having a water solubility at 25° C. of 15 mass ppm or less and a melting point of 10° C. or more;
(b) 3.6 mass % to 60 mass % of a first solvent that is ε-caprolactone;
(c) 19.5 mass % to 85 mass % of a second solvent having a water solubility at 25° C. of 1 mass % or less; and
(d) 1 mass % to 30 mass % of a surfactant,
wherein the pesticidal active ingredient is at least one selected from the group consisting of pyraclostrobin, pydiflumetofen, pyridachlometyl, and ethyl 2-[(3-{2-chloro-4-fluoro-5-[3-methyl-4-(trifluoromethyl)-2,6-dioxo-1,2,3,6-tetrahydropyrimidin-1(2H)-yl]phenoxy}pyridin-2-yl)oxy]acetate,
the second solvent comprises at least one selected from the group consisting of alkyl benzenes and alkyl naphthalenes,
a total content of the pesticidal active ingredient, the first solvent, the second solvent, and the surfactant being 60 mass % or more,
a content of the first solvent relative to a content of the pesticidal active ingredient being from 1.2 times by mass to 15.0 times by mass,
a content of the second solvent relative to the content of the pesticidal active ingredient being from 6.5 times by mass to 25.0 times by mass.

2. The liquid pesticidal composition according to claim 1, wherein the content of the pesticidal active ingredient is from 4 mass % to 10 mass %.

3. The liquid pesticidal composition according to claim 1, wherein the content of the first solvent is from 5 mass % to 40 mass %.

4. The liquid pesticidal composition according to claim 1, wherein the content of the second solvent is from 40 mass % to 80 mass %.

5. The liquid pesticidal composition according to claim 1, wherein a content of the surfactant is from 5 mass % to 20 mass %.

6. The liquid pesticidal composition according to claim 1, wherein the content of the first solvent relative to the content of the pesticidal active ingredient is from 1.3 times by mass to 6.0 times by mass.

7. The liquid pesticidal composition according to claim 1, wherein the content of the second solvent relative to the content of the pesticidal active ingredient is from 7.0 times by mass to 13.0 times by mass.

8. The liquid pesticidal composition according to claim 1, wherein the content of the first solvent is from 10 mass % to 30 mass %.

9. The liquid pesticidal composition according to claim 1, wherein the content of the second solvent is from 50 mass % to 75 mass %.

10. The liquid pesticidal composition according to claim 1, wherein the content of the first solvent relative to the content of the pesticidal active ingredient is from 1.3 times by mass to 3.3 times by mass.

11. The liquid pesticidal composition according to claim 1, wherein the content of the second solvent relative to the content of the pesticidal active ingredient is from 7.0 times by mass to 9.0 times by mass.

* * * * *